United States Patent [19]

Gergek

[11] 4,365,152

[45] Dec. 21, 1982

[54] ENCODER FOR MACHINE CONTROL

[76] Inventor: Franc Gergek, 1905 - 2600 Don Mills Rd., Willowdale, Ontario, Canada, M2J 3B4

[21] Appl. No.: 329,044

[22] Filed: Dec. 9, 1981

Related U.S. Application Data

[63] Continuation of Ser. No. 198,465, Oct. 20, 1980, abandoned, which is a continuation-in-part of Ser. No. 25,583, Mar. 30, 1979.

[30] Foreign Application Priority Data

Oct. 3, 1978 [CA] Canada .................................. 312625
Oct. 31, 1978 [CA] Canada .................................. 315014

[51] Int. Cl.³ ............................................. G01D 5/34
[52] U.S. Cl. .............................................. 250/231 SE
[58] Field of Search ...................... 250/231 SE, 237 G; 324/175; 340/347 P

[56] References Cited

U.S. PATENT DOCUMENTS 4,268,747 5/1981 Becchi et al. ................. 250/231 SE Primary Examiner—David C. Nelms
Assistant Examiner—Darwin R. Hostetter
Attorney, Agent, or Firm—Stevens, Davis, Miller & Mosher

[57] ABSTRACT

An encoder arrangement for machines having a rotating worm shaft which controls the movement of a working part and which has an optical disc on the shaft whose movement is photoelectrically sensed and interpreted by a controller to govern drive mechanism for moving the part in accordance with a program. The disc and photoelectric sensing means are contained in a dust-proof casing mounted on the machine and surrounding the shaft. The disc is in the form of companion segments which are clamped to each other and about the shaft. The casing is in the form of companion shells which are mounted on the machine casing and are connected to each other about the shaft. A preferred use of the encoder arrangement is with paper cutting machines of the type having a backstop movable along a worm shaft.

12 Claims, 9 Drawing Figures

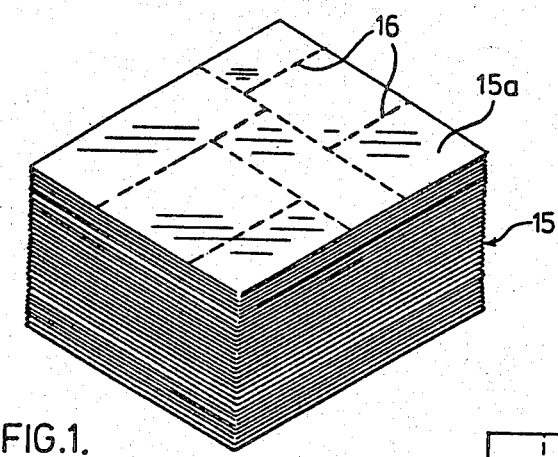
FIG.1.
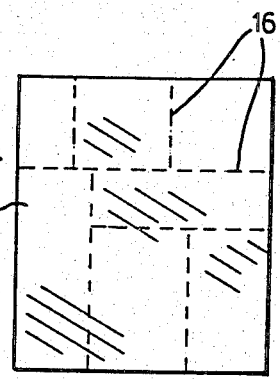
FIG.2.
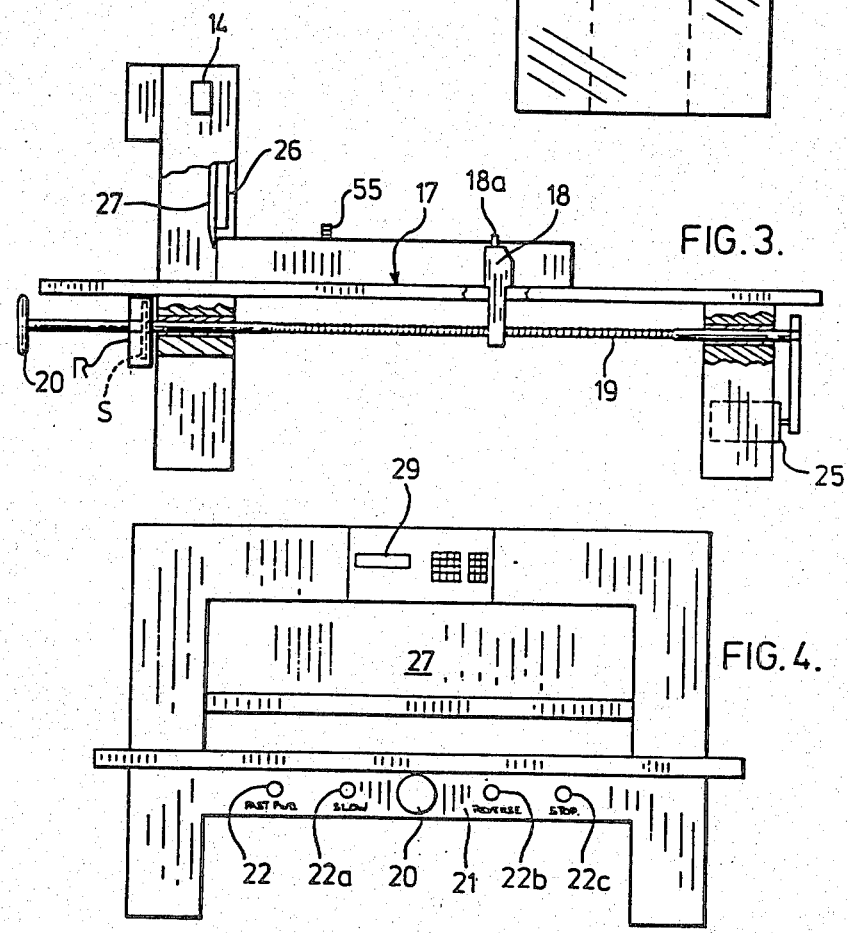
FIG.3.
FIG.4.

ENCODER FOR MACHINE CONTROL

This is a continuation of application Ser. No. 198,465 filed Oct. 20, 1980, abandoned, which in turn is a continuation-in-part of Ser. No. 25,583 filed Mar. 30, 1979.

BACKGROUND OF THE INVENTION

1. Field of the Invention

This invention relates to an encoder arrangement for an apparatus having a rotatable control shaft carrying a rotating optical disc whose movements are sensed by photoelectric cell means whose signals are interpreted and applied to controlling the rotation of the shaft. This application is a continuation-in-part of application Ser. No. 25,583, filed Mar. 30, 1979.

The arrangement has specific utility in connection with the control of paper cutting apparatus, for example, as shown in application Ser. No. 25,583, the disclosure of which is hereby incorporated by reference.

2. Description of the Prior Art

As a basis for describing the present invention, the essential features of the paper cutting apparatus of the previous application will be described. The paper cutting machine has a table for supporting a pile of sheets to be cut, cutting means and means for operating it. A backstop is mounted for movement along the table so as to position and advance the pile. There is drive means for moving the backstop along the table in either direction including a worm shaft and signalling means made up as follows. An optical disc is mounted on the worm shaft for rotation with it. The disc is provided with a regular series of radial strips of predetermined width and spacing. A pair of photosensors is spaced-apart a predetermined distance about the disc whereby there are produced, as the disc rotates in either direction, wave forms corresponding to the strips. A controller is electrically connected to the photosensors and the apparatus includes computer mechanism which converts the wave forms into distances corresponding to the travel of the backstop. Preferably the signalling means is provided with a vernier arrangement which includes an additional marking on the disc and a photosensor for sensing that marking. As movement of the backgauge is initiated, the controller moves it back until it is stopped by its own control. The controller presets, roughly, the position of the backgauge. After this rough setting, the controller moves the backgauge forward until the photosensor senses the vernier marking and this signifies to the controller the exact position of the backgauge.

SUMMARY OF THE INVENTION

The present invention includes an encoder assembly useful in apparatus of this type. This assembly includes a pair of companion half-discs each having a recess to permit their mounting against the shaft so that they can be connected together to provide a complete disc surrounding the shaft. Each half disc is provided with a signalling area which combines with that of the other half disc to form, on the assembled disc, a signalling track which can be sensed by appropriate sensing means, usually photoelectric means. This permits the disc to be mounted on a control shaft from the side without having to dismount the shaft or any other parts of the apparatus. Preferably, the half discs are each carried by a half-hub member which partially surrounds the shaft and is connected with the other half-hub member to form a complete hub which is clamped on the shaft.

In accordance with a preferred arrangement, a housing is provided to surround the disc. In this arrangement, the housing fulfills the dual function of protecting the disc and of providing a mounting for sensing means, for example, photoelectric cell and light emitting means. Besides being most effective in operation, this arrangement greatly facilitates the assembly of the device.

The housing may be a casing, split into two parts, which can be assembled together to surround the shaft and which encloses both photocells and light emitting means as well as the signalling disc. The casing is connected to the frame of the machine so as to retain it in fixed position relative to the shaft which rotates within it.

A preferred encoder assembly, according to the invention, is in the form of a kit made up of a pair of companion disc segments mountable on the shaft and a pair of companion shell members for connecting to each other surrounding the disc and shaft and connectable to the frame of the machine. The photoelectric means for sensing movements of the disc are mounted within one of the shell members.

In a preferred construction each shell member has spaced-apart opposed parallel sidewalls, desirably of overall semi-circular shape, and a connecting wall extending between the peripheries of the sidewalls and terminating at each end in an outstanding connecting flange. Each of the sidewalls is provided with a recess to register with the recess on the other shell to form an opening surrounding the shaft and spaced from it by a clearance gap. A pair of spaced-apart circuit boards are mounted within one shell substantially parallel to the sidewalls and adjacent to the connecting wall. One of the circuit boards carries photocell means and the other light emitting means.

The disc is preferably made up of a pair of segments each having a half hub carrying an arcuate plate appropriately perforated at intervals to allow penetration of the light beam to the photoelectric cell.

Dust-stripping is preferably provided to protrude beyond the recesses of the shells to close the gap between them and the shaft. Preferably, one of the shells is also provided with dust-stripping protruding beyond the edge abutting with the other shell to provide a dust-tight shield between the respective shells.

In accordance with the invention, the mounting procedure is as follows. One half of the encoder casing, provided with the light source and photocells is placed in operative position against the shaft and is connected in fixed position to the frame of the machine. Then, the two halves of the encoder disc assembly are brought together around the shaft within the casing and secured in place, the encoder disc being adjusted to the proper radial position on the shaft vis-a-vis the light source and photocells. Once this is accomplished, the other side of the casing is brought into place about the shaft to abut the previously placed half of the casing and the two halves secured together so the completed casing forms an entire enclosure about the working parts of the device.

BRIEF DESCRIPTION OF THE DRAWINGS

The invention, as outlined, will now be described more specifically by reference to the accompanying drawings, which illustrate preferred embodiments, and in which:

FIG. 1 is a perspective view of a pile of sheets ready to be cut;

FIG. 2 is a plan view of the pile showing the top sheet;

FIG. 3 is a front elevation of a cutting apparatus equipped according to the invention;

FIG. 4 is a front elevation of the apparatus of FIG. 3 showing the control panel;

DESCRIPTION OF THE PREFERRED EMBODIMENTS

Figure 5:
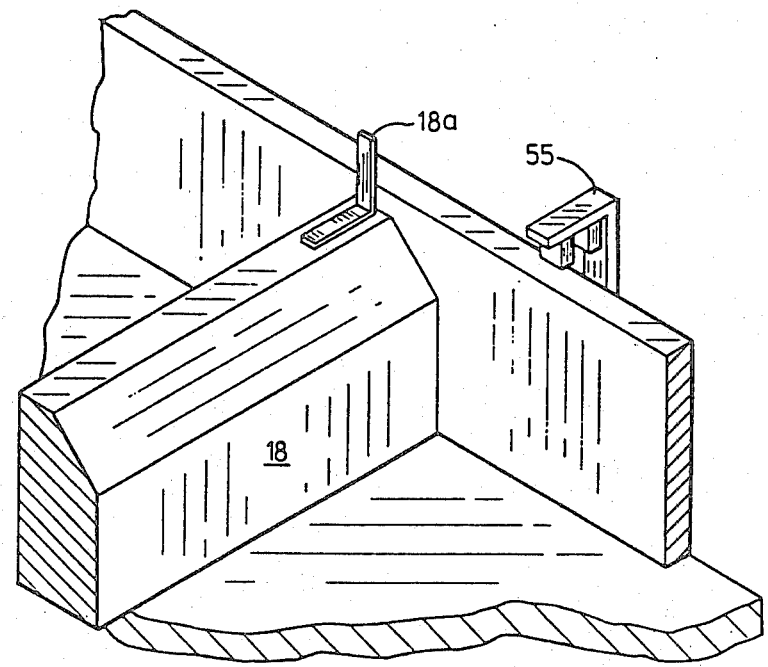
FIG. 5 is a perspective view illustrating the relationship between the backgauge and the position reference switch.

Referring more particularly to the drawings, the nature of a cutting apparatus, according to the invention, will be explained in terms of its basic operation, as follows.

The printed stock from sheet fed presses comes in the form of a pile of sheets 15 (FIG. 1). Each sheet 15a is marked as at 16 to show the cuts required to divide the sheets into pages, coupons, etc. (FIG. 2).

The apparatus includes a table 17 on which the paper stock is laid up in the pile 15 to a few inches high and a backgauge 18 movable alongside the table by a worm gear 19, and having an upstanding reference marker 18a.

The gear 19 can be turned manually by a standby wheel 20 or automatically, according to the invention, by a motor mechanism controlled by push buttons in a panel 21 (FIG. 4). Normally, cutters have up to five separate push buttons 22, 22a, 22b, etc. (or a joystick with concealed switches) to provide fast forward, slow forward, reverse, sometimes slow reverse and stop.

The push buttons or switches are connected to a control box (not shown) through relays and other circuitry which may be of a conventional nature which, in turn, governs the direction and speed of the motor 25 (FIG. 3).

Above the table 17 there is a clamp 26 (FIG. 3) which presses the paper stock tightly down during the cutting and guillotine 27 (FIG. 3) which comes down and cuts the stock.

The cutting procedure is as follows. The backgauge 18 is moved to the first cutting position. The paper stock pile 15 is laid on the table and pushed firmly against the backgauge 18. Through a foot pedal or other means, the driving mechanism is activated and the clamp 26 squeezes the paper stock down. The display 29 (FIG. 4) displays the position of the backgauge 18.

As in the prior application, the optical signalling disc assembly S is fixedly mounted on the worm shaft 19. In accordance with the present invention, this assembly is made up of arcuate complementary plates 30 and 31, preferably of sheet metal and respectively mounted on hub segments 32 and 33, preferably of fiber. Each plate 30, 31, has an arcuate marginal track made up of a regular series of radial slots 35, and, spaced inwards from the track, a single slot 36. The hub segment 32, for example, has inner and outer axially extending faces 32a and 32b and adjoining end faces. The inner face 32a ends at a narrow flange 32d. The other hub is similar, as shown by like numerals.

The disc 30 is secured to the hub segment as follows. The plate 30 is juxtaposed and adhesively secured to an end face with its inner edge abutting the flange 32d. Screws 37 are provided to extend through openings in the segment 32 and into the segment 33 so that the segments 32 and 33 may be drawn together about the shaft 19 and clamped to it.

In accordance with the invention, the optical disc S, mounted on shaft 19, is enclosed within a protective casing R, mounted on the frame of the apparatus, which houses the photoelectric cells and light emitting means, which are responsive to the movements of the disc S.

Figure 6:
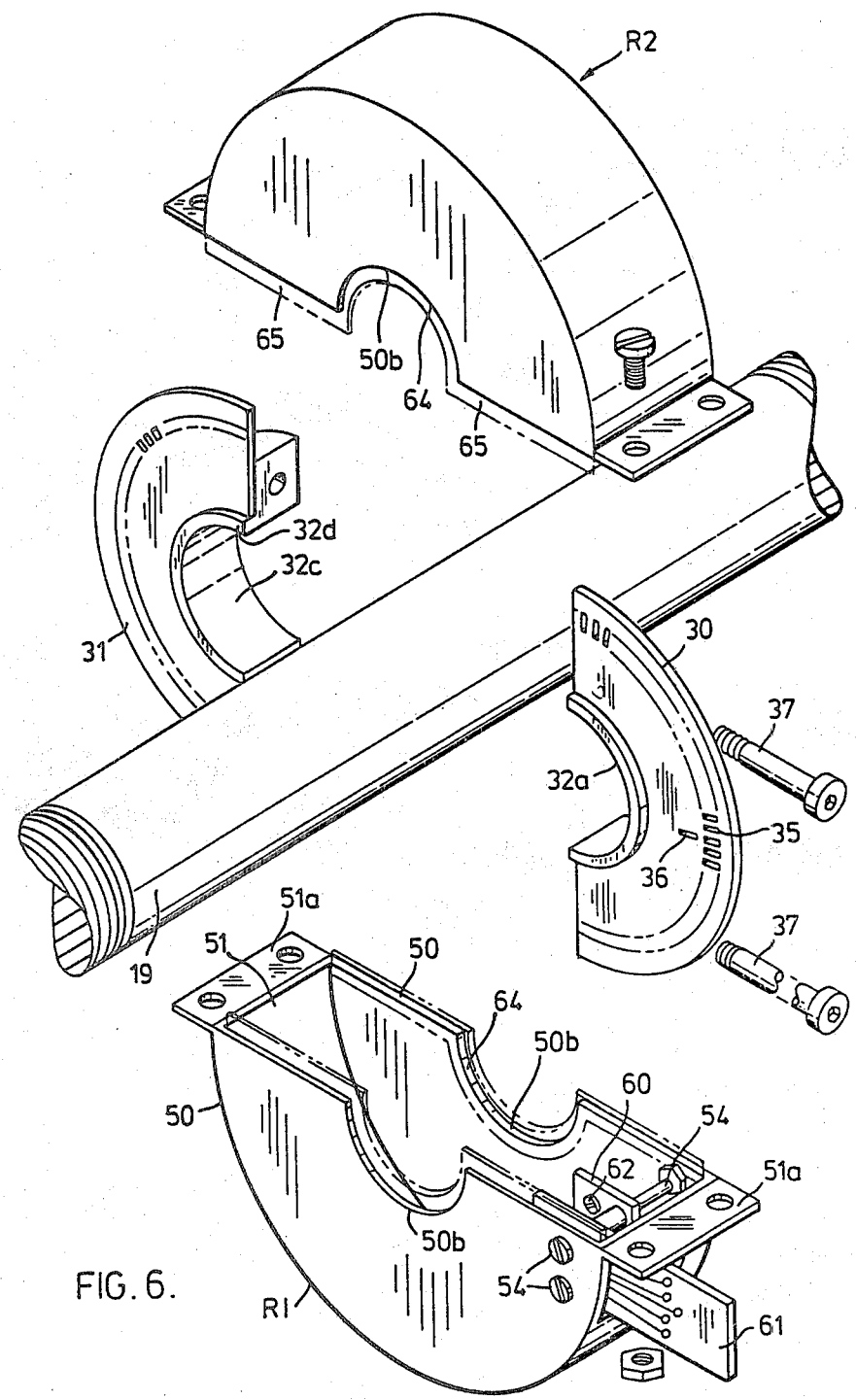
FIG. 6 is an exploded view showing the various parts of a preferred form of encoder assembly in relative position prior to mounting on a control shaft.
Figure 7:
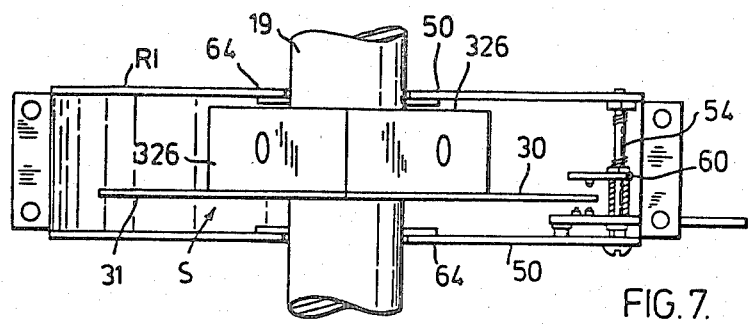
FIG. 7 is an end elevation of the shell carrying the circuit boards.
Figure 8:
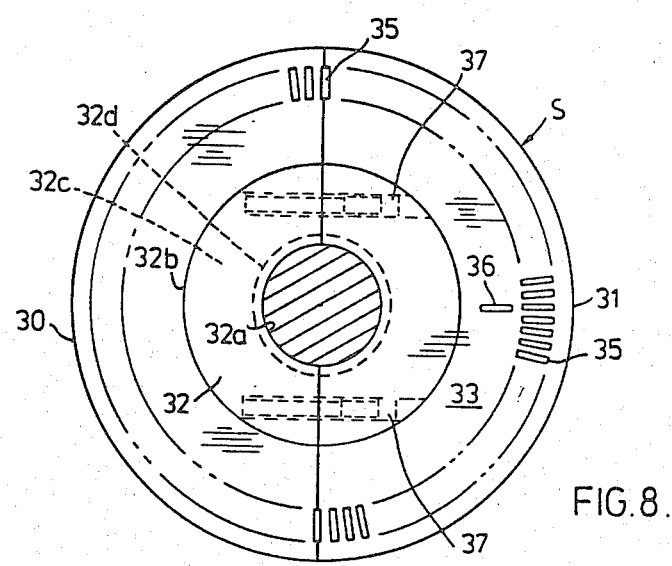
FIG. 8 is a front elevation of the encoder disc assembled on the shaft.

The casing R is made up of similar companion sheet metal shells $R_1$ and $R_2$ which fit about the shaft 19. In the preferred form shown in FIGS. 6 and 7, these shells are of generally circular contour. The shell $R_1$, for example, is made up of spaced-apart semi-circular sidewalls 50 and extending between them a bridging wall 51 having a connecting flange 51a extending outward at each end provided with holes connected to the companion flange of the shell $R_2$. Extending inward from the straight edge of each wall 50 is an arcuate recess 50b having a diameter sufficiently larger than that of the shaft 19 to leave a small clearance gap when the casing is mounted beside the shaft.

Extending between the walls 50, spaced slightly inward from the wall 51, are a pair of mounting bolts 54. Mounted on the bolts 54 are small spaced-apart parallel circuit boards 60 and 61 having holes through which the bolts 54 extend. A screw 62 extends through the other end of the board 60 to a wall 50 and a screw 63 from the board 61 to the other wall 50. Appropriate nuts and spacing members cooperate with the bolts to function, as shown, to engage the circuit boards and walls of the shell. The boards 60 and 61 are thus held firmly in place. relative to each other and to the shell $R_1$. The shell $R_2$ is of the same construction as the shell $R_1$.

Both shells $R_1$ and $R_2$ are provided with dust-stripping. For example, a shaped piece of felt 64 (shown in phantom lines in FIG. 6) is mounted on the inside of each wall 50, 50a and projects slightly beyond the margin of the wall and is adapted about the recess 50b to bridge the gap between the shell R and the shaft 19 and the straight edge so as to overlap the fissure between the abutting straight edges of the walls 50 and 50a to bar dust from entering between the shells $R_1$ and $R_2$.

The circuit board 61 mounts three photocells 70, 71 and 72, connected to terminals 70a and 70b, and balancing resistors 73, 74 and 75. Circuit board 60 mounts two light emitting diodes 76 and 77 connected between terminals 76a and 77a and intervening current-limiting resistor 78.

Figure 9:
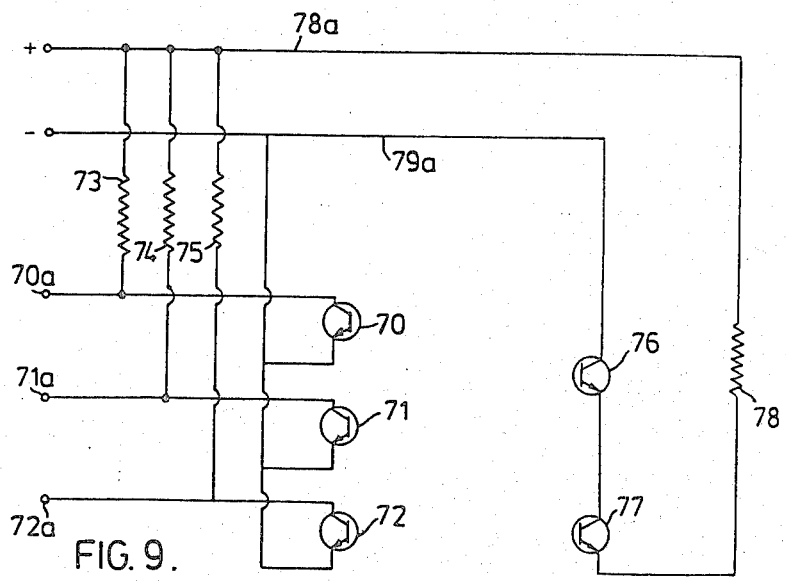
FIG. 9 is a circuit diagram including the encoder cells and the light emitting means, and associated elements and associated circuitry.

As shown in the circuit diagram of FIG. 9, the diodes 76 and 77 and the resistor 78 are connected by circuit wiring 78a and 79a to the electrical supply terminals 78 and 79. One side of each photocell 70, 71 and 72 is connected to one of the terminals 70a, 71a and 72a leading to the micro computer which controls the backgauge of the cutter, as described in the specification, and through a resistor 73, 74 and 75 to the positive supply line 78a.

Mounting

The encoder assembly is mounted on the apparatus as follows.

First, the shell $R_1$ is brought into position near the shaft 19 and is screwed to the brackets 80 fixed to the machine frame. Then, a segment of the disc S is manipulated into position within the casing R and next to the shaft 19 and the other disc segment is abutted against it about the shaft and the two segments loosely secured together. Then the disc S is rotated to its proper position relative to the photocells and clamped to the shaft 19 by tightening the screws 37.

An opaque patch is secured to the plate 30 to overlap the gap between the respective plates 30 and 31 at each side of the hub and placed radially so as to overlap the slot 36. The patch serves the dual function of screening the gap 38 from the slot 36, and, as sighting means, showing the width of the gap between the respective plates 30 and 31, to aid in adjusting the gaps at each side of the hub.

The device is now functional and it merely remains for the shell $R_2$ to be abutted against the shell $R_1$ and secured to it by screws through the overlapping flanges to complete the protective casing R. The casing R isolates the disc S, the photocells, and light emitting device from the surrounding atmosphere. This provides protection from dust which would otherwise accumulate and interfere with the operation of the device.

As will be evident to those skilled in the art, appropriate materials may be readily selected for the various parts. For example, the shells are preferably drawn from sheet metal, but could be molded from plastic material. The disc segments are desirably made of thin sheet metal punched to provide the sensing slots. Or, the disc assembly could be similar to that shown in the applicant's prior application. The hub elements may conveniently be made from resin impregnated fiberboard. The circuit boards may be made of any convenient insulating material, for example, fiberboard.

I claim:

1. An encoder attachment for a rotatable control shaft, comprising,
    a pair of companion shells for surrounding the shaft in abutting relationship to form a casing,
    each shell having spaced-apart sidewalls having edges for abutting the walls of the other shell and a connecting wall,
    each sidewall having a central recess extending inward from said edges to form an opening to accommodate the shaft and provide a clearance gap,
    photocell means and light emitting means mounted in one of said shells,
    a pair of optical disc segments for mounting on the shaft within the casing to form an optical sensing disc.

2. An encoder attachment, as defined in claim 1, in which there are spaced-apart circuit boards mounted within one of the shells adjacent to the connecting wall and the photocell means are mounted on one board and the light emitting means on the other.

3. An encoder attachment, as defined in claim 1, in which resilient dust-stripping is mounted on the inside of each wall to protrude from its recess for forming a seal between the wall and the shaft.

4. An encoder attachment, as defined in claim 3, in which each shell has edges for abutting those of the other shell and one shell has dust-stripping mounted on its walls and protruding beyond its edge to overlap the edge of the other shell to bar the entry of dust.

5. A shell for an encoder assembly of a type described for connecting to a companion shell to form a casing about a rotatable shaft, comprising,
    spaced-apart sidewalls and a connecting wall extending therebetween to form an enclosure,
    each sidewall having a free edge for abutting a free edge of the companion shell,
    a central registering recess in each sidewall extending inward from its edge to accommodate the shaft and provide a clearance gap,
    resilient stripping on each sidewall and protruding therebeyond about the margin of the recess for providing a dust bar between the wall and the shaft,
    and resilient stripping on the sidewalls of said shell and extending beyond its free edge for overlapping the abutting wall of the companion shell to provide a dust bar between the shells.

6. A shell, as defined in claim 5, in which the sidewalls are of overall semi-circular shape and the connecting wall is arcuate.

7. A shell, as defined in claim 5, in which each end of the connecting wall terminates in an outwardly extending flange for connection to a similar flange on the companion shell.

8. An apparatus, including a frame and a control shaft rotatable therein,
    an optical signalling disc mounted on said shaft,
    photocell means for sensing the rotation of the disc and control means responsive to the photocell means for controlling the rotation of the shaft, comprising,
    a casing made up of companion recessed shells fitted and connected together about the shaft and disc and fixed to the frame to provide an enclosure sealed from the surrounding atmosphere,
    said photocell means being mounted within one of said shells in a position to sense the movements of said disc.

9. An optical disc segment for an encoder assembly, comprising,
    a semi-annular hub segment made up of a solid overall arcuate body having a semi-cylindrical shaft-engaging surface and a transverse mounting surface,
    and an arcuate plate secured to said mounting surface provided with openings for sensing the photoelectric means.

10. An optical disc segment, as claimed in claim 9, in which the transverse mounting surface has a narrow annular flange adjoining the shaft-engaging surface and the plate has an edge abutting said flange.

11. A disc mounting element for an encoder assembly comprising,
    a semi-annular hub segment made up of a solid overall arcuate body having a semi-cylindrical shaft-engaging surface and a transverse mounting surface for securing to an arcuate plate provided with openings for sensing by photoelectric means.

12. A disc mounting element, as defined in claim 11, in which the mounting surface has a narrow annular flange adjoining the shaft-engaging surface for abutting said arcuate plate.

* * * * *